(12) United States Patent
Croyle

(10) Patent No.: US 6,904,478 B2
(45) Date of Patent: Jun. 7, 2005

(54) TRANSCEIVER INTERFACE REDUCTION

(75) Inventor: Richard Croyle, Camberley (GB)

(73) Assignee: Nokia Mobile Phones Limited, Espoo (FI)

( * ) Notice: Subject to any disclaimer, the term of this patent is extended or adjusted under 35 U.S.C. 154(b) by 317 days.

(21) Appl. No.: 09/803,036

(22) Filed: Mar. 12, 2001

(65) Prior Publication Data

US 2001/0044865 A1 Nov. 22, 2001

(30) Foreign Application Priority Data

Mar. 10, 2000 (GB) ............................................. 0005890

(51) Int. Cl.⁷ ............................................. G06F 13/42
(52) U.S. Cl. ....................................................... 710/106
(58) Field of Search ................................. 710/100, 106, 710/56, 62, 72, 305–317; 713/503; 327/170; 326/21; 703/23

(56) References Cited

U.S. PATENT DOCUMENTS

| | | | |
|---|---|---|---|
| 5,864,587 A | 1/1999 | Hunt | |
| 5,940,448 A | 8/1999 | Kuo | |
| 5,991,546 A * | 11/1999 | Chan et al. | 710/62 |
| 6,370,603 B1 * | 4/2002 | Silverman et al. | 710/72 |
| 6,523,081 B1 * | 2/2003 | Karlsson et al. | 710/305 |
| 6,615,301 B1 * | 9/2003 | Lee et al. | 710/106 |
| 6,625,472 B1 * | 9/2003 | Farazmandnia et al. | 455/557 |

FOREIGN PATENT DOCUMENTS

| | | |
|---|---|---|
| CN | 01117330.0 | 10/2000 |
| EP | 0898388 | 2/1999 |

* cited by examiner

Primary Examiner—Paul R. Myers
(74) Attorney, Agent, or Firm—Antonelli, Terry, Stout & Kraus, LLP

(57) ABSTRACT

A transceiver interface operating in accordance with the USB protocol includes a reduced number of pin outs by replacing a logic pair of single ended outputs $V_p$ and $V_m$ with a sole single ended zero output Se0. The interface is intended to form part of a USB device incorporated in apparatus such as a cellular radio telephone.

20 Claims, 3 Drawing Sheets

| D- | D+ | Série |
|---|---|---|
| 0 | 0 | Se0 |
| 0 | 1 | Low speed detect |
| 1 | 0 | Full speed detect |
| 1 | 1 | Bus error |

TRANSCEIVER INTERFACE REDUCTION

BACKGROUND OF THE INVENTION

The present invention relates to a Serial Bus transceiver interface, particularly although not exclusively for use in a Universal Serial Bus (USB) device.

It is well known to employ a bus to carry signals within and between electronic devices. The definition of one such bus, the Universal Serial Bus (USB) is described in the following reference document—Universal Serial Bus Specification Revision 1.1 published by the USB Implementation Forum. The USB standard provides specifications for a host, a device and the cabling which links them. Amongst other requirements of the standard, a USB host must be capable of detecting the speed of those devices with which it is communicating. There are four possible such states as set out in the table of FIG. 1 below.

The USB standard has become very popular with manufacturers of personal computers in particular. More recently and particularly with the expansion of the Internet, it is becoming even more necessary for a computer to be connected, at least part of the time, to a telephone line to permit the transfer of data such as electronic mail. In the case of a laptop computer, it is often not convenient or possible to connect to a fixed telephone line. Thus, interfaces have been developed to allow a mobile telephone to be connected to a computer. Such interfaces can place severe demands on a lightweight battery-powered device such as a mobile telephone where considerations of size and complexity of circuitry together with power consumption are very important.

SUMMARY OF THE INVENTION

It is thus an aim of the present invention to seek to overcome the disadvantages of the prior art and further to reduce the complexity of a transceiver bus interface.

SUMMARY OF THE INVENTION

Thus, according to the invention, there is provided a transceiver interface connectable, in use, to a cable, the interface including an input for receiving a pair of signals from the cable, and a logic circuit connected to the input having a single logic output line, wherein the logic circuit has a first output state where both signals are below a predetermined level and a second output state where either or both signals exceed the predetermined level.

Preferably, the transceiver operates under the USB protocol in which case the interface may form part of a USB device which receives a pair of differential signals as inputs such that the first output state is indicative of a single ended zero state while the second output state is indicative of any other state of the differential signals. Conveniently, the logic means may be a NOR gate. The transceiver may form part of a USB device which may further include an application specific integrated circuit (ASIC) having a physical connection to the logic means via the logic line to facilitate the provision of the USB control protocol. The device may be included in a mobile telephone handset or the like to permit connection to a USB host or hub connected thereto. Where the device is included in a mobile telephone, the USB control functions may be added to the ASIC providing the telephone functions.

In order to aid in understanding the present invention, a particular embodiment thereof will now be described by way of example and with reference to the accompanying drawings, in which:

BRIEF DESCRIPTION OF THE DRAWINGS

In the following, a full description of the USB standard is omitted, it being understood that this forms part of the general knowledge. Referring to FIGS. 1 to 4, the table set out in FIG. 1 highlights a requirement of the USB standard, namely that a host 1 must be able to determine the speed with which a device 2 connected to the host 1 is communicating via a USB cable 3. This state information is present as a differential signals carried on a pair of twisted pair conductors D+/D–4,5 housed within a shielded cable 3 which also contains power and ground conductors 7,8. Thus, a single ended zero state (Se0) is indicated if the voltage on both twisted pair conductors 4,5 is low; low speed operation of the device 2 is indicated by a low voltage on D+ 4 and a high voltage on D– 5; full speed operation of the device 2 is indicated by a high voltage on D+ 4 and a low voltage on D– 5; and a bus error is indicated by a high voltage on both D+ and D– 4,5.

DETAILED DESCRIPTION OF THE INVENTION

Figures 1, 2:
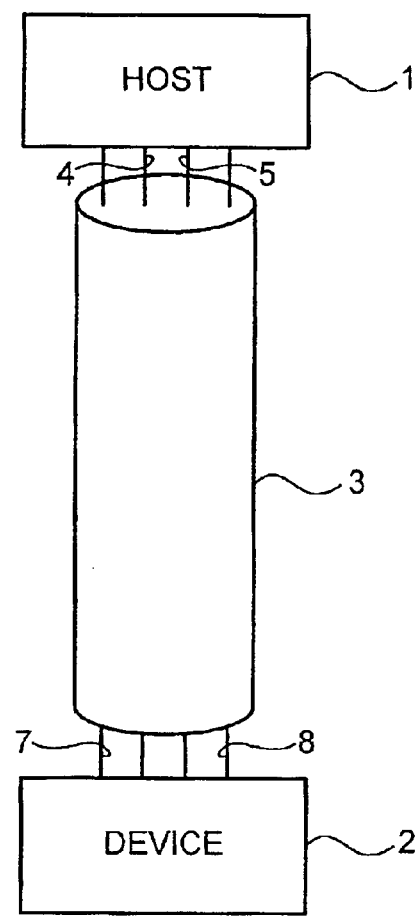
FIG. 1 is a table setting out a requirement of the USB standard in relation to interfaces.
FIG. 2 is a schematic view of a prior art USB topology.
Figure 3:
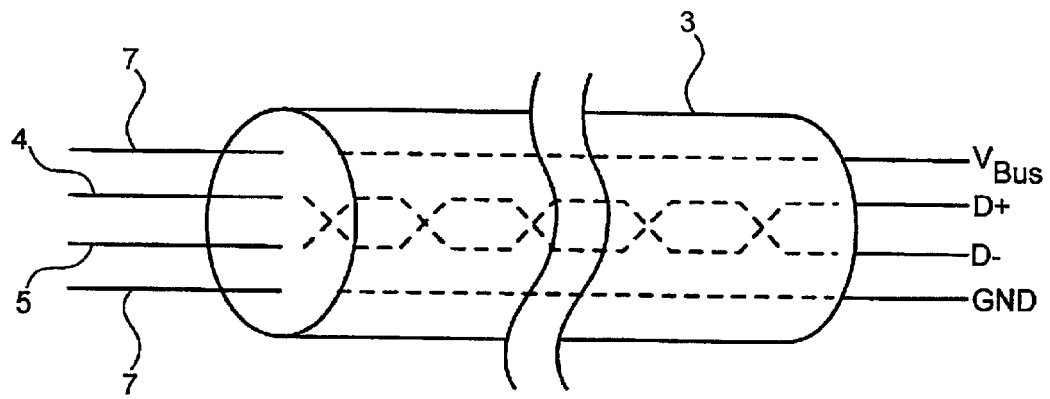
FIG. 3 is a diagrammatic view of a prior art USB cable.
Figure 4:
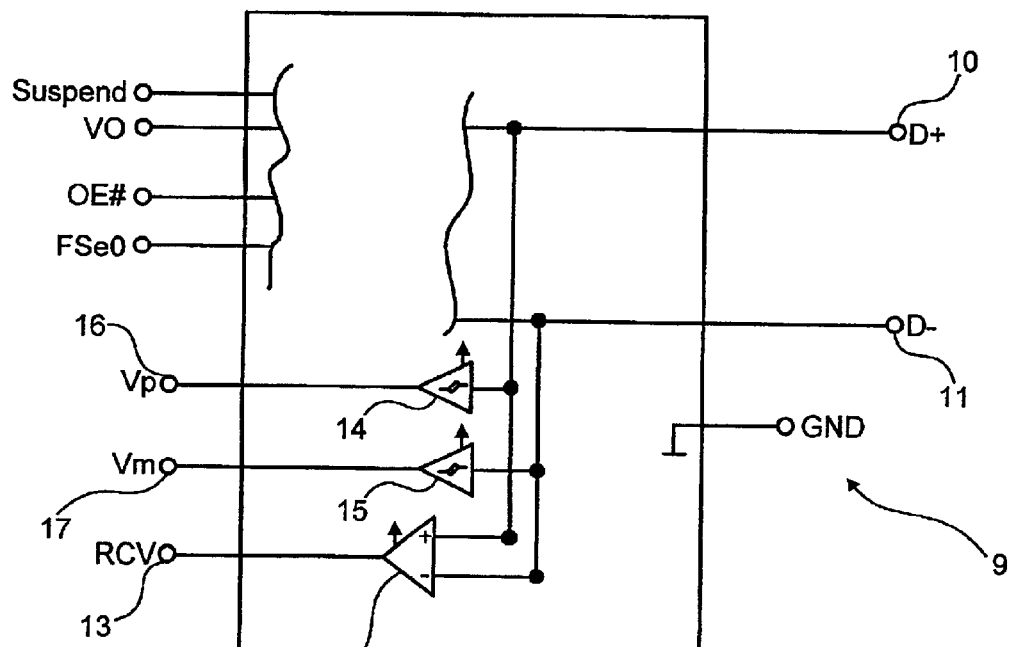
FIG. 4 is a partial circuit diagram of a prior art USB device mode interface showing the I/O interface section.

Referring in particular to FIG. 4, a typical prior art USB device mode interface 9 has connections 10,11 to the twisted pair conductors D+/D– 4,5. In a receive mode, differential signals carried by the twisted pair cables of the USB cable 3 are received at the connections 10,11 and passed to an amplifier 12 which provides a logic output RCV 13 which is indicative of whether differential data is being received high (RCV high) or low (RCV low) by the interface 9. In addition to the RCV output 13, differential signals received from the twisted pair conductors D+/D– 4,5 are translated by separate Schmitt triggers 14,15 into single ended logic output $V_p$ and $V_m$. 16,17. Thus, the single ended output 16,17 can be used subsequently to determine in which of the four states set out in FIG. 1 the USB is operating.

Figure 5:
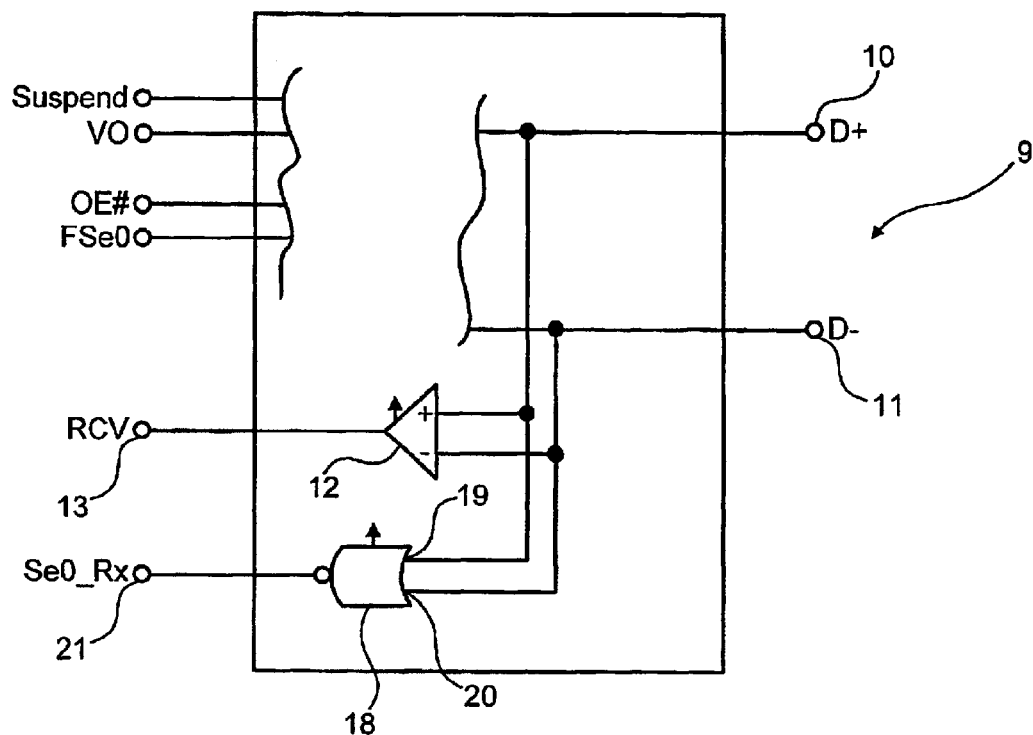
FIG. 5 is a similar partial circuit diagram of an embodiment of a USB device mode interface according to the invention.

Turning to FIG. 5, an embodiment of a USB device mode interface according to the invention is shown in which the RCV output 13 is determined in the same manner as described above in relation to the prior art circuit arrangement. However, the single ended circuit elements 14,15 of the prior art circuit are replaced by a single NOR gate 18 which receives as inputs 19,20 the differential signals D+ and D– 14,15. Thus, the gate 18 provides a logic output Se0 21 that is high if both D+ and D– 14, 15 are low while any other combination of differential input signals results in the Se0 logic output 21 being low. Thus, the interface is capable of determining the presence of the sole state relevant to a device under this portion of the USB standard.

Figure 6:
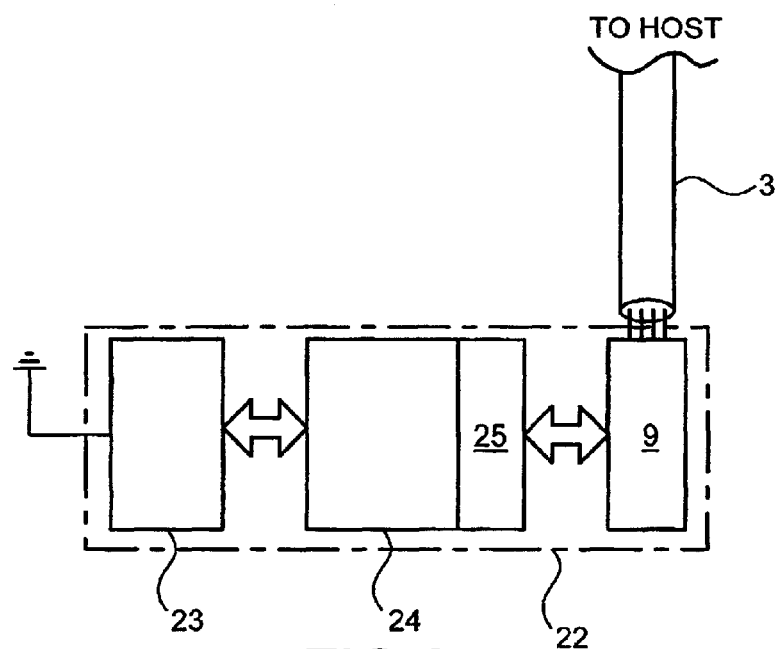
FIG. 6 is a block diagram of a mobile telephone handset incorporating the USB device mode interface of FIG. 5.

It will be recognized by those skilled in the art that a device transceiver interface 9 does not operate in isolation but is required to permit the USB protocol to be employed by a logic device 2 when communicating with a USB host 1. As mentioned previously, details of the USB signaling protocol may be found in the USB reference—Universal Serial Bus Specification Revision 1.1. Typically, the instructions necessary to implement the protocol are held on an application specific integrated circuit ASIC, which communicates with the transceiver 9 via a set of tracks on a substrate (not shown) on which both components are mounted. FIG. 6 shows in outline a mobile telephone handset 22 containing baseband and radio frequency (RF) portions 23,24. The baseband portion further contains an ASIC 25 which, amongst other functions, is provided with the functionality necessary to facilitate the operation of the handset 22 as a USB device when connected to a USB host 1. In this regard, it should be noted that the number of tracks required to connect the ASIC 25 to the USB interface 9 is reduced by one as a single Se0 line replaces the Vp and $V_m$ lines of the prior art interface. Furthermore, as a consequence of the reduction in the number of lines, both the ASIC 25 and the interface 9 require one less pin-out. In a non-illustrated variant of the above embodiment, an ASIC having the conventional number of pin-outs is connected to the USB interface. Whereas, in the prior art case where the Vp and $V_m$ lines from an interface are connected to respective pins on the ASIC, one pin only on the ASIC is connected via the track to the USB interface 9 the other pin being tied in a high logic state.

Finally, those skilled in the art will recognize that the present invention is applicable not only to mobile telephone handsets but to any other device which can operate as a USB device such as printers, scanners and tape drives, for example. It will also be appreciated that the reference throughout the description to a USB host should be taken to include a hub whether self or bus powered.

What is claimed is:

1. A transceiver interface connectable, in use, to a cable, the interface including an input for receiving a pair of signals from said cable, and a logic circuit connected to the input having a single logic output line, wherein the single logic output line of the logic circuit has a first output state where both signals are below a predetermined level and a second output state where either or both signals exceed the predetermined level and wherein the logic circuit is a NOR gate.

2. An interface as claimed in claim 1, wherein the first output state is indicative of a single ended zero state.

3. An interface as claimed in claim 1, wherein the second output state is indicative of a non-single ended zero state.

4. An interface as claimed in claim 2, wherein the second output state is indicative of a non-single ended zero state.

5. A serial bus device including a transceiver interface as claimed in claim 2.

6. A serial bus device including a transceiver interface as claimed in claim 3.

7. A serial bus device including a transceiver interface as claimed in claim 1.

8. A device as claimed in claim 7, wherein the device includes an application specific integrated circuit having a single physical connection to said logic output line.

9. A mobile radio telephone including a device as claimed in claim 8 as dependent therefrom, wherein the application specific integrated circuit also provides mobile telephony functions.

10. A device as claimed in claim 8, wherein the bus is Universal Serial Bus.

11. A device as claimed in claim 7, wherein the bus is Universal Serial Bus.

12. A mobile radio telephone including a device as claimed in claim 11 as dependent therefrom, wherein the application specific integrated circuit also provides mobile telephony functions.

13. A transceiver interface connectable, in use, to a cable, the interface including an input for receiving a pair of signals from said cable, and a logic circuit connected to the input having only a single logic output line, wherein the logic circuit has a first output state where both signals are below a predetermined level and a second output state where either or both signals exceed the predetermined level and wherein the logic circuit is a NOR gate.

14. An interface as claimed in claim 13, wherein the first output state is indicative of a single ended zero state.

15. An interface as claimed in claim 14, wherein the second output state is indicative of a non-single ended zero state.

16. An interface as claimed in claim 13, wherein the second output state is indicative of a non-single ended zero state.

17. A serial bus device including a transceiver interface as claimed in claim 13.

18. A device as claimed in claim 17, wherein the device includes an application specific integrated circuit having a single physical connection to said logic output line.

19. A mobile radio telephone including a device as claimed in claim 18, as dependent therefrom, wherein the application specific integrated circuit also provides mobile telephony functions.

20. A device as claimed in claim 17, wherein the bus is Universal Serial Bus.

* * * * *